(12) United States Patent
Bischof et al.

(10) Patent No.: US 6,936,078 B2
(45) Date of Patent: Aug. 30, 2005

(54) FLUORESCENT BRIGHTENER PIGMENT COMPOSITIONS

(75) Inventors: Peter Bischof, Bergheim (DE); Christiane Hutter, Bedburg (DE); Claudio Puebla, Lörrach (DE)

(73) Assignees: Ciba Specialty Chemicals Corp., Tarrytown, NY (US); Albemarle Corporation, Richmond, VA (US)

(*) Notice: Subject to any disclaimer, the term of this patent is extended or adjusted under 35 U.S.C. 154(b) by 16 days.

(21) Appl. No.: 10/311,403

(22) PCT Filed: Jun. 12, 2001

(86) PCT No.: PCT/EP01/06660
§ 371 (c)(1),
(2), (4) Date: Jul. 31, 2003

(87) PCT Pub. No.: WO01/98446
PCT Pub. Date: Dec. 27, 2001

(65) Prior Publication Data
US 2004/0034939 A1 Feb. 26, 2004

(30) Foreign Application Priority Data
Jun. 19, 2000 (EP) .............................. 00810529

(51) Int. Cl.⁷ ........................... C11D 3/42; C09B 69/10; D06L 3/12
(52) U.S. Cl. .......................... 8/648; 162/162; 510/301; 510/349
(58) Field of Search ............................ 8/648; 510/301, 510/349, 419, 438, 6; 162/162

(56) References Cited

U.S. PATENT DOCUMENTS 5,605,883 A * 2/1997 Iliff et al. .................... 510/444
5,622,749 A   4/1997 Rohringer et al. .......... 427/158

FOREIGN PATENT DOCUMENTS

| DE | 4401471  | 7/1994  |
|----|----------|---------|
| EP | 1055774  | 11/2000 |
| GB | 769344   | 3/1957  |
| GB | 845462   | 8/1960  |
| GB | 869801   | 6/1961  |
| GB | 980583   | 1/1965  |
| GB | 1301007  | 12/1972 |
| WO | 98/42685 | 10/1998 |
| WO | 00/58432 | 10/2000 |

OTHER PUBLICATIONS

Derwent Abstract 1987–014040 for SU 1235890 (1986).
Chemical Abstract vol. 83, No. 6, 44792c (1975).
Derwent Abstract 1994–236328 [29] for DE 4401471 (1994).
Derwent Abstr. 2001–092622 [11] for EP 1055774 (2000).

* cited by examiner

Primary Examiner—Margaret Einsmann
(74) Attorney, Agent, or Firm—Kevin T. Mansfield

(57) ABSTRACT

The invention relates to a fluorescent brightener pigment and the use of said pigment, which is derived from formaldehyde, for improving the whiteness of paper or textiles, or for incorporation in detergent compositions.

13 Claims, No Drawings

FLUORESCENT BRIGHTENER PIGMENT COMPOSITIONS

The invention relates to a fluorescent brightener pigment and the use of said pigment for improving the whiteness of paper or textiles, or for incorporation in detergent compositions.

Organic white pigments on the basis of urea/formaldehyde condensation products have long been known. Thus, for example, the preparation, structure and morphology of such products have been described by A. Renner in "Die macromolekulare Chemie", Bd. 149 (1971), pages 1–27. These products improve the degree of whiteness and the opacity of paper, whilst in coatings they improve the degree of whiteness and covering.

Due to their fluorescence, optical brightening agents serve to increase the whiteness of goods with which they are treated. However, optical brightening agents do not increase either opacity or covering of such goods.

The present invention combines the opacity-increasing properties of white pigments with the whiteness-increasing properties of optical brightening agents.

Accordingly, the present invention relates to a fluorescent brightener pigment obtainable by addition of a fluorescent building-block prior to or during preparation of the pigment, said pigment being derived from formaldehyde. Within this context, a fluorescent building block may be defined as a precursor of a fluorescent compound which, after being chemically bonded within the pigment, exhibits fluorescence.

Preferably, the components of the pigment are urea, formaldehyde and a fluorescent building block. The brightener pigment is obtained by (a) condensation of an aqueous solution of urea and formaldehyde at a pH of between 6.0 and 8.0 at a temperature of between 30 and 100° C.,
(b) gelation of the resulting condensate by treatment with an acid and, finally,
(c) allowing the resulting gel to react and working-up, whereby, prior to or during the condensation, a water soluble or water dispersible fluorescent building-block is added.

In a preferred aspect, the fluorescent building-block is added in the condensation step (a).

The fluorescent building-block is of formula

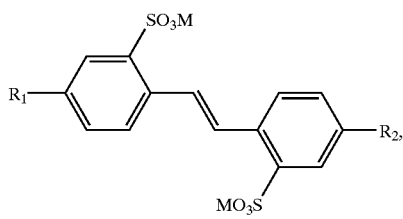

(1)

wherein $R_1$ and $R_2$, independently, represent —$NH_2$ or —$NHC_1$–$C_4$alkyl and M is hydrogen, an alkaline or alkaline earth metal (whereby M is one half mole equivalent metal), ammonium, mono-, di-, tri- or tetra$C_1$–$C_4$alkylammonium, mono-, di-, tri- or tetra$C_2$–$C_4$hydroxyalkylammonium or mixtures thereof.

Preferably, in formula (1), $R_1$ and $R_2$ both represent —$NH_2$ and M is hydrogen, lithium, potassium, sodium or ammonium.

The amount of fluorescent building-block added may vary over a large range, for example, between 0.001 and 10% by weight, based on the total quantity of urea and formaldehyde employed. However, amounts of between 1.0 and 7%, especially between 2.0 and 5.0%, by weight, based on the total quantity of urea and formaldehyde employed, are preferred. Moreover, it is also possible to use mixtures of fluorescent building-blocks.

The condensation reaction step (a) is carried out in aqueous solution at a pH of between 6 and 8, preferably at between 6.5 and 7.5 and especially at a pH value of 7.0. The temperature of reaction lies between 30 and 100° C., preferably between 65 and 75° C. and the reaction time is between 1 and 3 hours. Optionally, the reaction may be carried out in the presence of a protective colloid such as polyvinyl alcohol, starch, hydroxyethyl cellulose, hydroxypropyl cellulose or, preferably, carboxymethyl cellulose.

From a practical point of view, formaldehyde may be used as a 30% aqueous solution.

The molar ratios of urea to formaldehyde may vary between 1.0 mole of urea to 1.0 to 2.0 moles of formaldehyde, especially between 1.0 mole of urea to between 1.3 and 1.6 moles of formaldehyde.

The gelation step (b) takes place by the addition of acid and may be performed without isolation of the pre-condensate obtained in step (a). The time for gelation lies, in most cases, between 4 and 45 seconds. Suitable acids may be either inorganic or organic in nature. Thus, for example, sulphuric acid, phosphoric acid, hydrochloric acid, nitric acid, sulphamic acid, formic acid, oxalic acid, maleic acid, succinic acid or chloroacetic acids, or mixtures thereof, may be employed. The function of the acid is to induce the formation of colloidal particles of sufficiently high specific surface area. The amount of acid added required lies between 10 and 100, preferably between 20 and 50 millimoles per mole urea.

The gel obtained in step (b) is then worked up by conventional methods in step (c), for example, by allowing to ripen, neutralizing and, finally filtering, washing, drying and, if required, milling, in order to obtained a suitable particle size.

From a practical point of view, milling may be performed either by wet milling or in an Ultra-Turrax™ grinder. In the case of wet milling in a pearl mill, the pigment is stirred at high speed together with glass beads until the desired mean particle size is obtained.

The fluorescent organic pigments, especially urea/formaldehyde condensation products, obtained accordingly have an extremely low content of free formaldehyde. Furthermore, the fluorescent building-block is chemically bound to the pigment. The products, encompassing principally polymers, are solid colloidal particles with a mean diameter of between 0.1 and 5 μm which agglomerate to pigment particles having a mean diameter of between 3 and 50 μm.

The structure of the pigment may, for example, be envisaged as possessing the following recurring structural element:

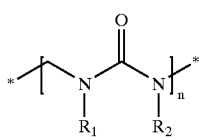

wherein $R_1$ and $R_2$ are

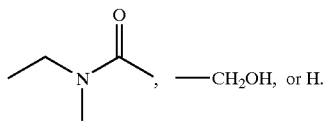, —CH$_2$OH, or H.

The fluorescent organic pigments, especially the urea/formaldehyde condensation products of the invention are in highly disperse form. They are especially suitable for optically whitening paper or textiles, or for incorporation in detergent compositions. The finely divided fluorescent brightener pigments may be used in powder form or in the form of aqueous dispersions. As such they are of especial interest for improving the degree of whiteness of paper products, whereby they may be applied directly to the pulp mass, in the size-press or as additives to coating colours.

The quantity of pigment used depends on the whitening effect to be achieved and on the method of application. Thus, for example, in the pulp mass between 0.5 and 15% by weight, based on the total amount of fibre, may be used, whereby not only the degree of whiteness, but also the opacity is significantly improved.

In size-press application a pigmented starch solution may be used.

For the application in coating, between 0.1 and 8, preferably between 1 and 4 parts by weight, based on the total weight of pigment in the coating colour, should be employed. As a rule a coating colour has a solids content of between 35 and 80, preferably between 40 and 70% by weight.

The fluorescent brightener pigments of the invention are especially suitable for the coating of paper, particularly ink-jet and photographic papers, wood, foils, textile materials, non-wovens and other suitable materials. They are most suitable for the coating of paper, cardboard and for photographic papers.

The coatings thus obtained exhibit not only a high degree of whiteness, but also possess excellent light stability. Furthermore, other desirable properties such as, for example, evenness, smoothness, volume and printability are also improved, since the brightener pigment functions additionally as a filler in the paper matrix.

The following Examples further illustrate the invention:

EXAMPLE 1

120.11 g. of urea are dissolved in 132.75 g. of demineralised water and varying amounts of 4,4'diaminostilbene 2,2'disulphonic acid (Formula 1, $R_1=R_2=NH_2$; M=H) as shown in Table 1 are added with stirring and neutralized with 50% sodium hydroxide solution. 290.27 g. of 30% aqueous formaldehyde solution are then added and the mixture stirred for 2 hours at 70° C. and pH 7. The pre-condensate is then treated with a solution of 6.4 g. of sulphamic acid in 211.29 g. of demineralised water. Gelation of the reaction mixture takes place in between 9 and 45 seconds. After a ripening time of approximately 10 minutes, the gels are reduced to an average particle size of between 1 and 2 mm. in a Universal grinder. The ground material is weighed and then slurried in the same weight of water. The suspension is adjusted to pH 10 with 50% sodium hydroxide solution, stirred for 1 hour and filtered. The filter-cake is washed with water and dried over night at 105° C. The polymers are then ground in a ball-mill for 3 hours.

The properties of the resulting fluorescent brightener pigments are summarized in Table 1.

TABLE 1

| Pigment Nr. | DAS[1] added | Yield. | Specific BET surface area | ISO-Brightness[2] R457 with UV | ISO-Brightness R457 without UV |
|---|---|---|---|---|---|
| (101) | None | 152.8 g | 24.6 g/m² | 96.5% | 96.5% |
| (102) | 0.45 g | 152.3 g | 23.1 g/m² | 100.9% | 98.5% |
| (103) | 0.92 g | 153.0 g | 20.7 g/m² | 102.7% | 99.2% |
| (104) | 10.97 g | 159.8 g | 37.5 g/m² | 95.2% | 88.8% |

Footnotes:
[1]DAS = 4,4'-Diaminostilbene 2,2'-disulphonic acid
[2]measured with an Elrepho 2000 spectrophotometer manufactured by Datacolor The degree of whiteness of pigment (104) is the lowest, although, with a value of 6.4% for the expression [Brightness with UV]–[Brightness without UV], it possesses the highest fluorescence. This property is especially advantageous in the following application Example.

APPLICATION EXAMPLE

The fluorescent brightener pigments obtained in the above Example are tested in a laboratory hand-sheet former (Rapid-Köthen hand sheet former with reaction vessel according to DIN 54358).

Twelve 60 g/m² sheets containing approximately 4% fluorescent brightener pigment are prepared. 5% of the pigments are added, as the retention is only 80%.

28.8 g. of dry bleached kraft pulp (80% birch sulphate and 20% pine sulphate, Schopper Riegler 23° C.) are charged to the vessel, made up to 4 litres with tap water and stirred for 10 minutes. 1.52 g dry weight of each of the pigments (101)–(104) are dispersed in 300 ml of demineralised water for 1 minute at 12,000 rpm with an Ultra-Turrax™ T25 and then transferred to the vessel containing the pulp. The suspension of pulp and filler is then defibrillated with an Ultra-Turrax T50 at 8,000–10,000 rpm during 30 seconds and then made up to a volume of 6 litres with tap-water. For the preparation of 60 g/m² sheets, 400 ml. of this suspension are measured out and, with stirring with a propeller stirrer at 500 rpm, treated with 2 ml. of a retention aid solution prepared by the addition of 0.15 g. of Praestaret™ PK 50 (Polyacrylamide form Stockhausen Company, Krefeld, Germany) to 400 g. of water and stirring for at least 45 minutes.

After exactly 20 seconds sheet formation is performed. The resulting sheets are then dried for 420 seconds at 92° C. and under a vacuum of 30 mbar.

The filler content of the brightener pigment is calculated by way of the nitrogen analysis determined by the Kjeldahl method.

The opacities and degrees of brightness of the sheets are then measured, the results being summarized in Table 2 below.

TABLE 2

| Pigment Nr. | DAS content[1] of pigment | Pigment content of paper | Opacity corrected to 60 g/m² | ISO-Brightness[2] R457 with UV | ISO-Brightness R457 without UV |
|---|---|---|---|---|---|
| None | | | 75% | 82.0% | 82.0% |
| (101) | None | 4.15%. | 82.3% | 85.5% | 85.5% |
| (102) | 0.22%. | 3.90% | 82.2% | 86.6% | 86.2% |

TABLE 2-continued

| Pigment Nr. | DAS content[1] of pigment | Pigment content of paper | Opacity corrected to 60 g/m² | ISO-Brightness[2] R457 with UV | ISO-Brightness R457 without UV |
|---|---|---|---|---|---|
| (103) | 0.44% | 3.94% | 82.2% | 87.6% | 86.7% |
| (104) | 5.03% | 4.05% | 80.7% | 89.6% | 86.6% |

Footnote:
[1]The content of DAS is based on the amounts of urea and formaldehyde used in the preparation of the pigment.
[2]measured with an Elrepho 2000 spectrophotometer manufactured by Datacolor The brightener pigment (104) containing 5.03% DAS exhibits, in comparison to the sheet containing no filler, an increase in ISO-brightness of 7.6% with and 4.5% without UV. In comparison to pigment (101), containing no DAS, pigment (104) shows an increase of ISO-brightness of 4.1% with and 1.1% without UV. The urea/formaldehyde condensate alone, containing no DAS, pigment (101), results in an increase in opacity of 7.3% in comparison to the sheet containing no filler, whilst pigment (104) still produces an increase in opacity of 5.7%. Despite the fact that pigment (104) results in a decrease of opacity of 1.6% when compared to pigment (101), this slight decrease is more than offset by a significant increase of the degree of whiteness of 4.1%.

What is claimed is:

1. A fluorescent brightener pigment obtainable by addition of a fluorescent building-block prior to or during preparation of the pigment, said pigment being derived from formaldehyde, wherein the fluorescent building-block is of formula

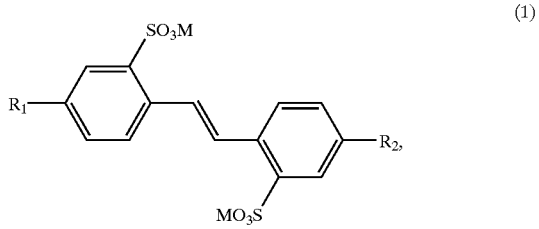

(1)

wherein $R_1$ and $R_2$, independently, represent —$NH_2$ or —$NHC_1$–$C_4$alkyl and M is hydrogen, an alkaline or alkaline earth metal, ammonium, mono-, di-, tri- or tetraC$_1$–C$_4$alkylammomium, mono-, di-, tri- or tetraC$_2$–C$_4$hydroxyalkylammonium or mixtures thereof.

2. A fluorescent brightener pigment according to claim 1, wherein the pigment is a urea/formaldehyde condensate.

3. A pigment according to claim 2, wherein the urea/formaldehyde condensate is prepared by
   (a) condensation of an aqueous solution of urea and formaldehyde at a pH of between 6.0 and 8.0 at a temperature of between 30 and 100° C.,
   (b) gelation of the resulting condensate by treatment with an acid and, finally,
   (c) allowing the resulting gel to react and working-up, characterized in that, prior to or during the condensation, a water soluble or water dispersible fluorescent building-block is added.

4. A pigment according to claim 3, characterized in that 1 mole of urea is condensed with between 1.0 and 2.0 moles of formaldehyde.

5. A pigment according to claim 3, wherein the amount of fluorescent building-block added is between 0.001 and 10% by weight, based on the total quantity of urea and formaldehyde employed.

6. A pigment according to claim 5, wherein the amount of fluorescent building-block added is between 1.0 and 7%, by weight, based on the total quantity of urea and formaldehyde employed.

7. A pigment according to claim 1, in which, in formula (1), $R_1$ and $R_2$ both represent —$NH_2$ and M is hydrogen, lithium, potassium, sodium or ammonium.

8. A composition containing a fluorescent brightener pigment obtainable according to claim 1 and at least one carrier.

9. A method of optically whitening paper, which comprises adding to paper or pulp an effective whitening amount of a fluorescent brightener pigment according to claim 1, in finely divided form, to a paper pulp mass, in a size-press or as an additive to paper coating colors.

10. A method according to claim 9, wherein the finely divided fluorescent brightener pigment is in the form of a powder or an aqueous dispersion.

11. A method of optically whitening textile materials, which comprises contacting said materials with an effective whitening amount of fluorescent brightener pigment according to claim 1, in finely divided form.

12. A method according to claim 11, which comprises washing the textile materials with a detergent composition a dispersion of the finely divided fluorescent brightener pigment.

13. A composition containing a fluorescent brightener pigment obtainable according to claim 1 which is a detergent.

* * * * *